(12) United States Patent
Goettfert et al.

(10) Patent No.: US 7,734,969 B2
(45) Date of Patent: Jun. 8, 2010

(54) FEEDBACK SHIFT REGISTER CONTROL

(75) Inventors: Rainer Goettfert, Taufkirchen (DE);
Stefan Rueping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 358 days.

(21) Appl. No.: 11/928,030

(22) Filed: Oct. 30, 2007

(65) Prior Publication Data

US 2009/0110137 A1    Apr. 30, 2009

(51) Int. Cl.
*G01R 31/28* (2006.01)
(52) U.S. Cl. .......................... 714/724; 377/72
(58) Field of Classification Search ................ 708/251, 708/254, 250; 377/54, 72; 711/163; 714/732, 714/724
See application file for complete search history.

(56) References Cited

U.S. PATENT DOCUMENTS

| | | | | |
|---|---|---|---|---|
| 5,383,143 A | * | 1/1995 | Crouch et al. ............... | 708/254 |
| 5,719,913 A | * | 2/1998 | Maeno ......................... | 377/54 |
| 5,966,313 A | * | 10/1999 | Sakamoto .................... | 708/250 |
| 6,728,740 B2 | * | 4/2004 | Kelly et al. .................. | 708/250 |
| 6,944,734 B2 | * | 9/2005 | Anzai et al. .................. | 711/163 |
| 7,461,312 B2 | * | 12/2008 | Tardif et al. .................. | 714/732 |
| 7,516,169 B2 | * | 4/2009 | Collier ........................ | 708/251 |

* cited by examiner

*Primary Examiner*—David Ton
(74) *Attorney, Agent, or Firm*—Dickstein, Shapiro, LLP

(57) ABSTRACT

Feedback shift register control circuit including a checking circuit having an input being coupled to a seed input of a feedback shift register or to an internal node of the feedback shift register, the checking circuit configured to be responsive to a signal at the input indicating that the feedback shift register is in a not-allowed state, or is going to assume a not-allowed state to output an exception signal; and a gate circuit being coupled to the seed input or the feedback shift register and configured to be responsive to the exception signal to change the state of the feedback shift register or seed the feedback shift register such that the feedback shift register assumes an allowed state.

25 Claims, 4 Drawing Sheets

FEEDBACK SHIFT REGISTER CONTROL

BACKGROUND

The present invention relates to feedback shift registers and control thereof.

Linear and non-linear feedback shift registers from parts of encryption algorithms and pseudorandom number generators. Encryption algorithms and pseudo number generators, in turn, are in, inter alia, used in security applications such as chip cards. In many applications if FSRs (FSR=feedback shift register) it is important that these shift registers operate correctly.

BRIEF DESCRIPTION OF THE DRAWINGS

Embodiments of the present invention are described in the following with respect to the figures, among which.

DETAILED DESCRIPTION OF THE INVENTION

Figure 1:
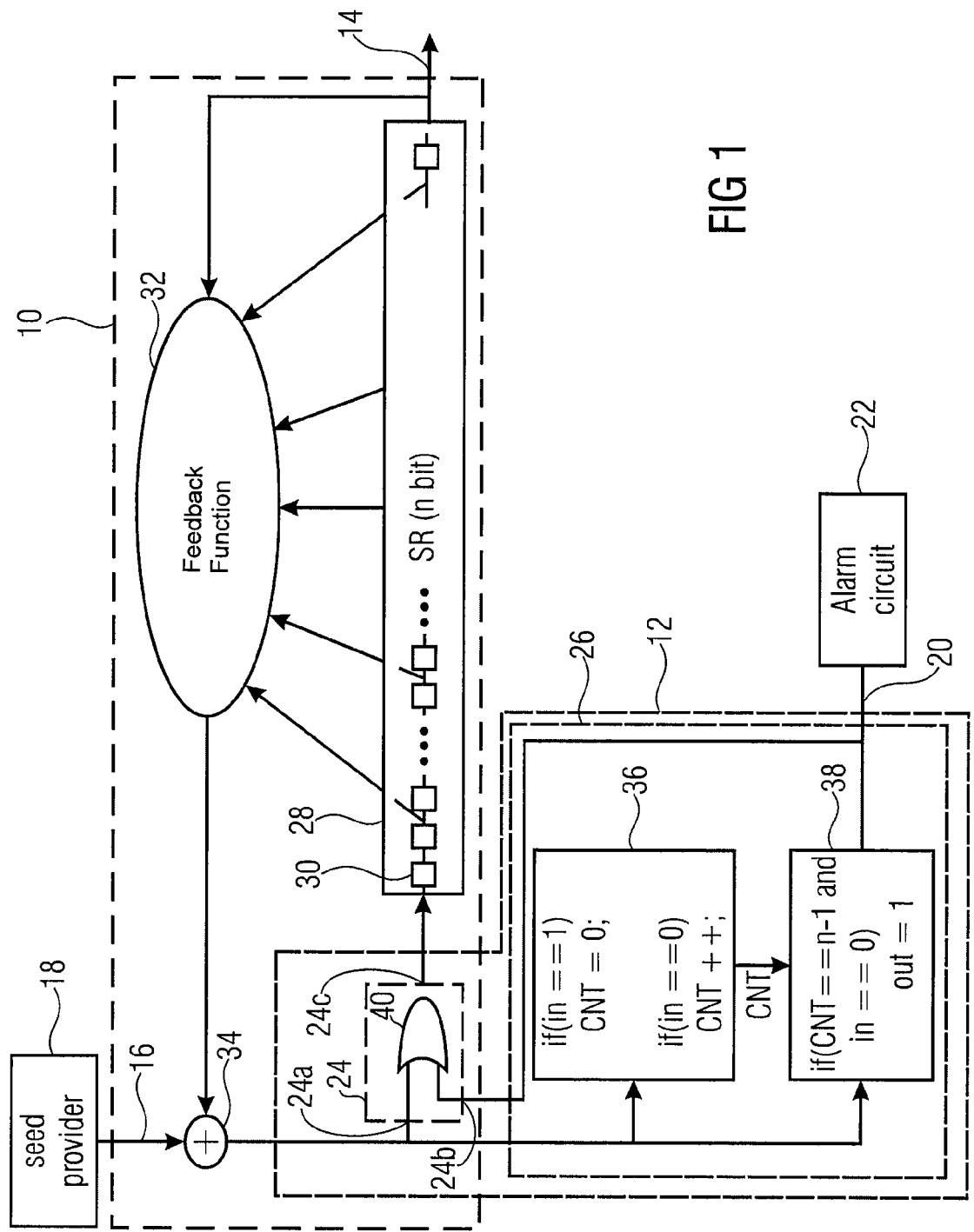
FIG. 1 shows a block diagram of a feedback shift register controlled by a control circuit according to an embodiment.

FIG. 1 shows a feedback shift register 10 controlled by a control circuit 12. The feedback shift register 10 comprises an output for outputting an output signal of the feedback shift register 10 and an input 16 for receiving a seed for the feedback shift register 10. The input 16 is connected to a seed provider 18. Further, the feedback shift register 10 is operatively coupled to the control circuit 12 in a way discussed in more detail below. Optionally, an alarm circuit 22 may be provided, with the control circuit 12 comprising an output 20 being connected to the alarm circuit 22.

Internally, the control circuit 12 comprises a gate circuit 24 and a checking circuit 26. The gate circuit 24 comprises a first input 24a and a second input 24b, as well as an output 24c. The gate circuit 24 is coupled to the feedback shift register 10 such that the gate circuit 24 is connected into a feedback path of the feedback shift register via the first input 24a and the output 24c. In other words, the gate circuit 24 is serially connected into the feedback path of shift register 10. The gate circuit 24 is, via the second input 24b, controllable to allow a signal at the first input 24a to pass from the first input 24a to the output 24c, or to present an alternative signal being different from the signal at the first input 24a, at the output 24c.

The checking circuit 26 is connected between the first and second inputs 24a and 24b of gate circuit 24, and is configured to control the gate circuit 24 via the second input 24b depending on the signal at the first input 24a of the gate circuit 24 corresponding to an impermissible signal or not. As will be described in more detail below, the impermissible signal may be selected such that control circuit 12 effectively prevents feedback shift register 10 from sticking to a state or states where the output signal of the feedback shift register at output 14 does not fulfill certain safety requirements. For example, the feedback shift register 10 may be designed such that same is able to assume $2^n$ different states. Further, the feedback shifter register 10 may be designed such that the feedback shift register stagnates into one of these $2^n$ states during the feedback shift register 10 not being fed by input 16 from seed provider 18. In this case, the impermissible state which the checking circuit 26 is responsive to, may be such a stagnating state.

In order to illustrate the cooperation of the feedback shift register 10 and the control circuit 12, some possibilities for the feedback shift register 10 are now described.

Feedback shift register 10 may be a DeBruijn shift register. DeBruijn shift registers have a simple cycle structure. In particular, in an n bit DeBruijn shift register, all the possible $2^n$ states are assumed, wherein an n-bit shift register or a shift register of length n is assumed to be a shift register having n memory cells, such as flip-flops, and the state of such an n-bit shift register at a time instance t is assumed to be the content of the n-flip-flops at time instance t. If an n-bit DeBruijn shift register is loaded with any state, then all possible $2^n$ states of the shift register are serially assumed by the shift register during the next $2^n$ clock cycles. Differently stated, in case of a DeBruijn shift register, the output sequence or output signal 14, has a period length of $2^n$ independent from the initial state of the shift register.

In case of the feedback shift register 10 being a DeBruijn shift register, the control circuit 12 would not be effective in the normal mode of operation of the feedback shift register 10, since all states of the feedback shift register 10 would be evenly secure. However, the control circuit 12 would be effective in cases of an error caused by unauthorized parties or by accident. Such errors comprise a stuck-at-one error in any of the internal devices of the feedback shift register, such as within the memory cells of flip-flops or the gates within the feedback function of the feedback shift register, or other faults occurring or being caused within the feedback shift register 10.

However, there are also other feedback shift registers having fixed or stationary states among their possible $2^n$ states, which when assumed, result in the internal register state stagnating in this fixed or stationary state, thereby causing a predictable stationary output signal. Despite this, such shift registers are sometimes preferable over DeBruijn shift registers, due to the following properties of DeBruijn shift registers. Firstly, in DeBruijn shift registers, each of the memory cells of the shift register is coupled to the feedback logic of the feedback shift register. In other words, there is no DeBruijn shift register with a sparse feedback function, i.e., a feedback function having only a few logical operations. This, in turn, results in the inability to hardware-efficiently implement DeBruijn shift registers. Further, it is difficult to combine a plurality of DeBruijn shift registers having different lengths to provide a combined shift register having a greater period length. For example, it may happen that a combination of a DeBruijn shift register of length 32 and a DeBruijn shift register of length 33 each generating an output sequence of period $2^{32}$ and $2^{33}$, respectively, generates a combined sequence of period length $2^{33}$, i.e., the least common multiple of the original period lengths, only.

Accordingly, the feedback shift register 10 may also be a shift register of length n generating an output sequence of period length $2^n-1$. Such feedback shift register may have a sparse feedback function and may be combined with other shift registers of the same type resulting in the higher period length. For example, two shift registers of length 32 and 33 each having a period length of $2^{32}-1$ and $2^{33}-1$ my be combined such that the output of a logical combination of both output sequences has a period length of $(2^{32}-1) \cdot (2^{33}-1)$, i.e., about $2^{65}$.

Feedback shift registers having a length n and a period length of $2^n-1$ comprise, besides the $2^n-1$ permissible states, one impermissible or non-allowed state, namely a so-called fixed or stationary state. The latter state is fixed by way of the feedback function and may correspond to an "all 0 state" or "all 1 state", where the content of the memory registers of the feedback shift register is all 0s or all 1s, respectively, depending on the specific feedback function. If the shift register is initialized into this fixed state, then same generates a constant output, i.e., an output of an all 0 sequence, or all 1 sequence at the output. Thus, besides the $2^n-1$ admissible states, there is also one fixed state which maps into itself by way of the feedback function per cycle. In other words, the feedback shift register has two cycles, namely a long cycle of length $2^n-1$ and a short cycle of length 1.

The coexistence between the admissible state and the non-allowed state among the possible states of the feedback shift register of the just-mentioned kind, raises problems when considering the seed to be provided by seed provider 18. The seed input into the feedback shift register should be selected randomly, i.e. should be a sequence of random bits. For example, the seed provider 18 may be a true random number generator based on, for example, a physical noise source. In this case, it is difficult to prevent the seed provider 18 from selecting a seed that results in the non-allowed state. Rather, it is easier to configure the seed provider 18 such that same selects each of the $2^n$ possible states of the shift register with equal probability. That is, the non-allowed fixed state is selected with the same probability as any of the admissible states. However, if the fixed state results from seeding the feedback shift register, the output of the feedback shift register would be unacceptable in that same is constant and thus, highly predictable.

In case of the feedback shift register 10 being such a shift register having a period length of $2^n-1$, the control circuit 12 and the checking circuit 26, respectively, could be configured to be responsive to a fixed or stationary state. In other words, the checking circuit 26 could be configured to be responsive to a run of 0s or a run of 1s within the feedback shift register's feedback signal or output sequence that exceeds some run length so as to avoid the feedback shift register 10 sticking to a fixed or a stationary state.

After having described rather generally the elements and the mode of operation of the feedback shift register 10 and the control circuit 12, a possible implementation of the same is described in more detail below.

In particular, the feedback shift register 10 may, as shown in FIG. 1, comprise a series 28 of memory cells 30 serially connected to each other, as well as a feedback function circuit 32 combining, according to a feedback function, the contents of certain memory cells 30. In particular, the feedback function circuit 32 may receive the content of the last memory cell 30 of series 28 connected to output 14, as well as the content of at least one other memory cell of series 28. An output of the feedback function circuit 32 is connected to the other end of series 28 opposite to output 14 via logic gate 34 which influences the feedback signal output by feedback function circuit 32, based on the seed at input 16. The gate logic 34 may be, for example, an NAND gate. As shown in FIG. 1, the gate circuit 24 is, via its first input 24a and its output 24c, connected between the output of logic gate 34 and the input of shift register 28. As mentioned above, the feedback shift register 10 may be designed such that there exists one content of the shift register 28 among the $2^n$ possible contents, which remains unchanged in the following clock cycles, if the seed signal at input 16 is constant and does not influence the feedback function circuit output. In this case, the output of shift register 28 and output 14, respectively, remains static.

In order to avoid the latter state within the shift register 28, the checking circuit 26 may, as shown in FIG. 1, comprise a counter 36 and a surveillance unit 38, both having an input being connected to the first input 24a. The counter 36 further comprises an output being connected to a further input of surveillance unit 38, the surveillance unit 38 comprising an output being connected to the second input 24b and the optional output 20. Further, the gate circuit 24 is exemplarily shown to be an NAND gate 40, having inputs and an output corresponding to inputs 24a and 24b and output 24c. The counter 36 is configured to reset its counter value CNT supplied at its output upon a 1 occurring at the first input 24a. Further, counter 36 is configured to increment its counter value CNT upon the occurrence of a 0 at the first input 24a per clock cycle. The surveillance unit 38, in turn, is responsive to the coexistence of the counter value CNT being equal to n−1 and the logical state at input 24a being equal to 0. In this case, the surveillance unit 38 outputs a logical 1 to output 20 and the second input 24b, respectively.

By implementing the feedback shift register 10 and the checking circuit 12 in the way exemplarily shown in FIG. 1, the control circuit 12 checks the sequence of bits shifted into shift register 28 as to whether the sequence is a run of n 0s. This is detected by the cooperation of the counter 36 and the surveillance unit 38. If the run of 0s of length 32 has been detected by the surveillance unit 38, same outputs a logical 1 to indicate this occurrence and to force a shift of a logical 1 into the shift register 28 in the next clock cycle via gate 40.

In effect, the restriction of the exceptional measures of the control circuit 12 to specific states of the feedback signal enables the seed provider 18 to initialize the feedback shift register 10 and select the seed thereof among the whole possible states. Differing thereof, the avoidance of runs of 0s of run length 32 and longer within the feedback signal by way of unconditionally forcing the writing of a 1 into one of the cells 30 of the shift register 28 after the seeding by seed provider 18, would result in a restriction of the possible initial states of the shift register 10 effectively by factor of 0.5.

Further, due to the surveillance of the feedback signal, the circuit of FIG. 1 is also effective in detecting and eventually avoiding the feedback shift register assuming a fixed state during the normal operation of the feedback shift register, i.e., when not seeded by seed provider 18. Such a switching into a fixed state during the operation of the feedback shift register 10 may be the result of a physical attack to the feedback shift register such as by means of ion ray applications. In particular, the surveillance unit 38 would force a logical 1 to be shifted into shift register 28, while concurrently signaling the alarm situation to the optional alarm circuit 22. The alarm circuit 22 could be configured, upon receiving the alarm signal from surveillance unit 38, to take measures to prevent a success of the physical attack, such as switching off the whole circuit including the circuitry of FIG. 1 and the circuitry connected to output 14 (not shown), such as an encryption unit or the like. By means of an active counter measure against a further processing upon the occurrence of a fixed state of feedback shift register 10, mathematically an equal probability of the admissible $2^n-1$ state results.

Several modifications to the embodiment of FIG. 1 are possible. For example, differing from FIG. 1, the order in which the logic gate 34 and the gate circuit 24 are serially connected between the feedback function circuit 32 and the shift register 28 may be switched. With regard to the functionality and the remaining structure of the configuration of FIG. 2, the above considerations with respect to FIG. 1 also apply to FIG. 2.

Figure 2:
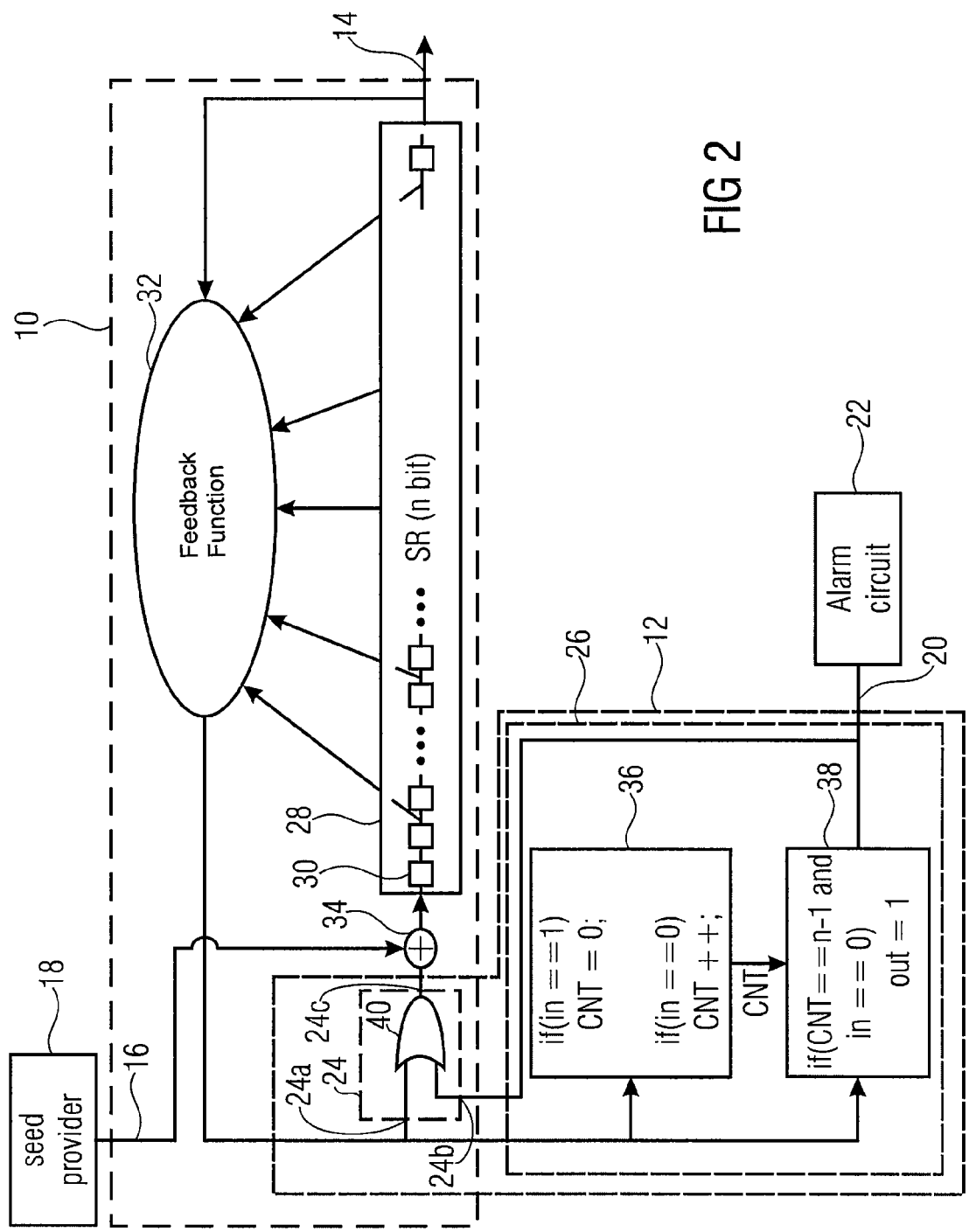
FIG. 2 shows a block diagram of a feedback shift register controlled by a control circuit according to a further embodiment.
Figure 3:
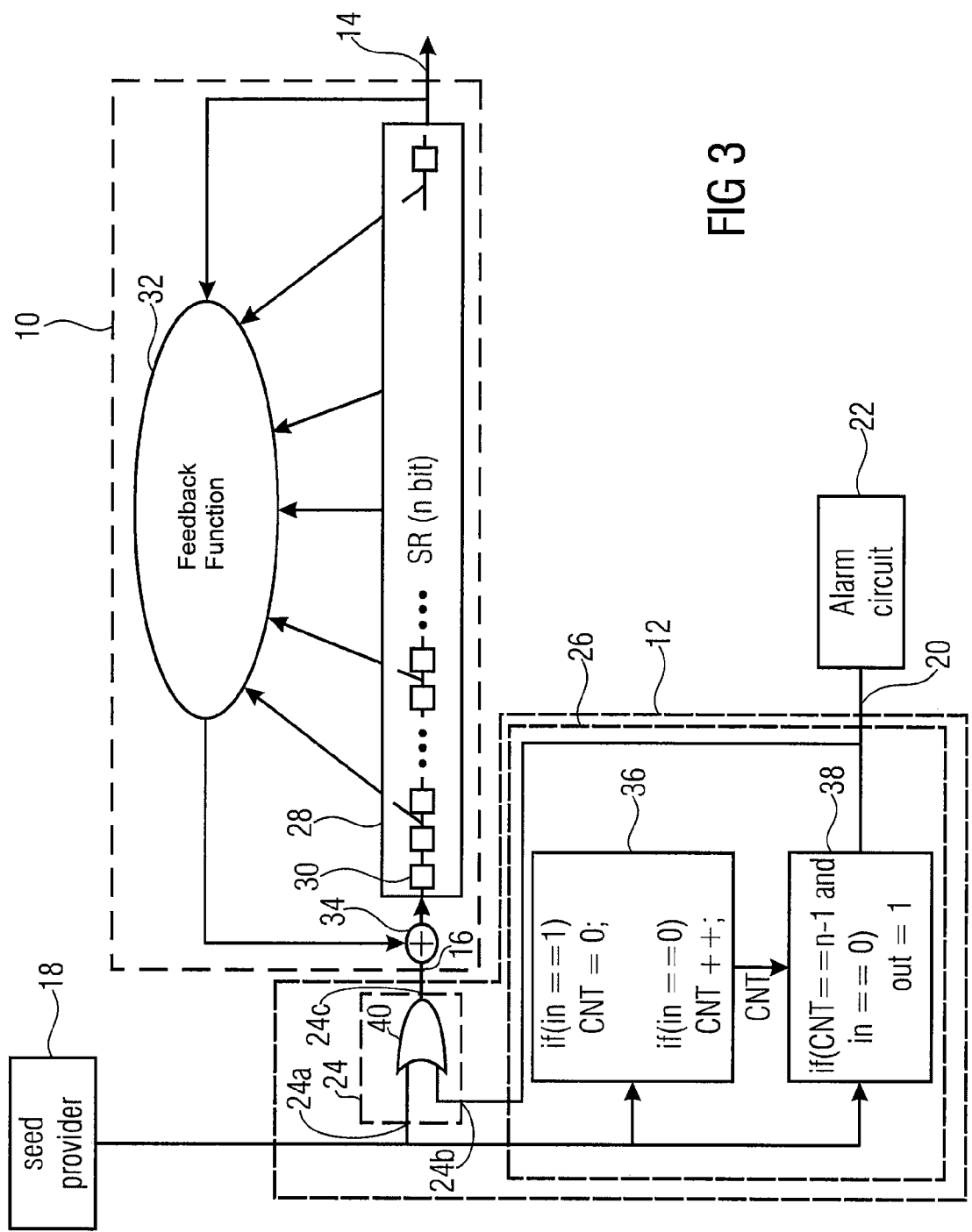
FIG. 3 shows a block diagram of a feedback shift register controlled by a control circuit according to a further embodiment.

Further, as shown in FIG. 3, it is possible to connect the gate circuit 24 between the seed provider 18 and input 16 so that the control circuit 12 surveys the seed input into feedback shift register 10, rather than the feedback signal thereof. Compared to FIGS. 1 and 2, the control circuit 12 is not able to detect and avoid a not-allowed state of the feedback shift register 10 during the normal operation, i.e., during the feedback shift register 10 not being seeded but running freely. However, the control circuit 12 in the case of FIG. 3, is able to avoid and detect seeds resulting in, or corresponding to, not-allowed states of the feedback shift register 10.

Further, a delay could be inserted between the first input 24a of gate circuit 24 and the inputs of counter 36 and surveillance unit 38 in FIGS. 1-3 in order to compensate the delay intervals by surveillance unit 38 so that the control circuits 12 would not only avoid maintenance of runs of run lengths longer than or equal to n, but even the occurrence of runs of run lengths longer than or equal to n.

Figure 4:
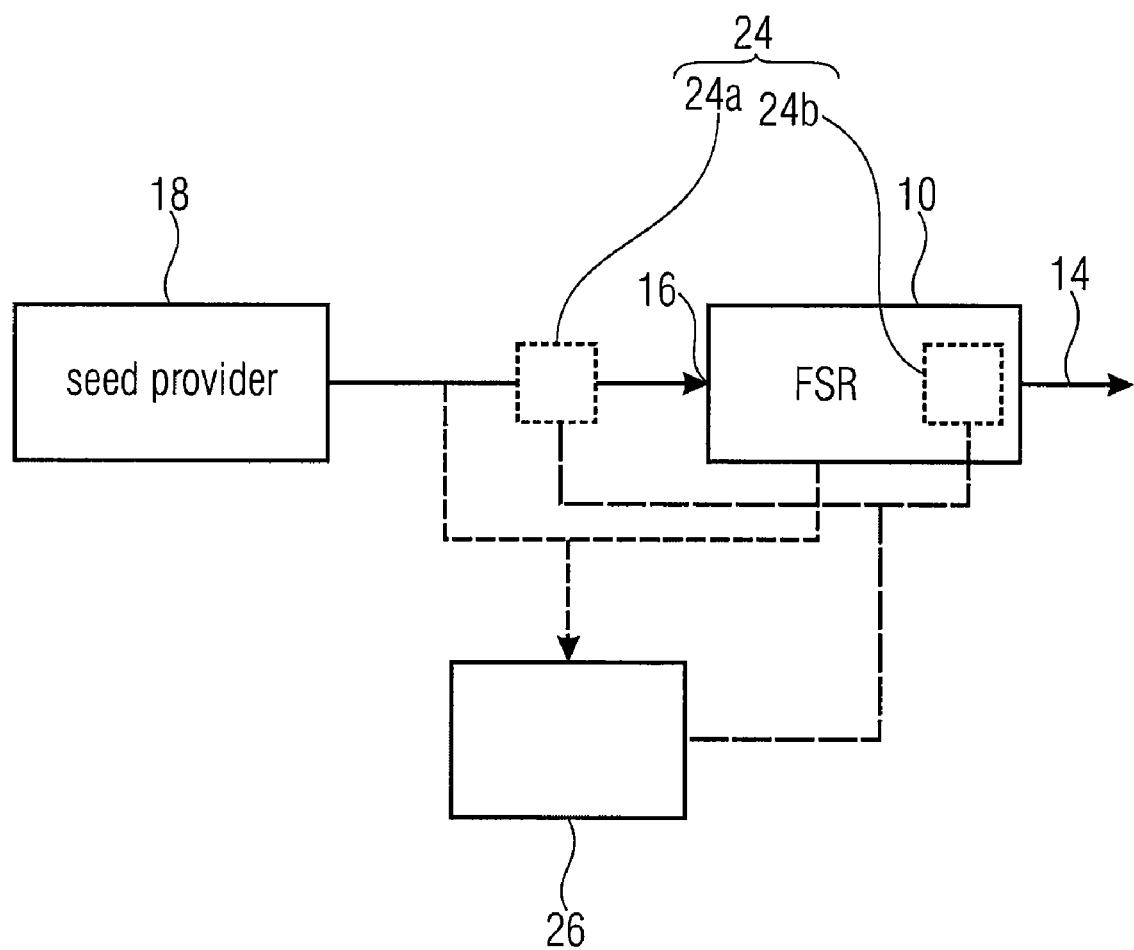
FIG. 4 shows a block diagram of a feedback shift register controlled by a control circuit according to a further embodiment.

As generally seen in FIG. 4, it is possible that the surveillance unit 26 checks as to whether the feedback shift register 10 assumes a non-allowed state based on a seed signal input into input 16, or based on internal signals of the feedback shift register 10 such as a feedback signal. Differing from the embodiments of FIGS. 1-3, for example, it is possible that the surveillance unit 26 checks the content of the memory cells of the shift register 28 directly by means of, for example, an n-bit comparator. Based on the check result, the gate circuit 24 prevents the feedback shift register 10 from remaining or even assuming the non-allowed state. To this end, the gate circuit 24 may be connected to the seed input 16 of the feedback shift register 10 as shown at 24a, or within the feedback shift register 10 itself as shown at 24b. An example for a coupling of the checking circuit 26 with the seed input 16 has been shown with respect to FIG. 3, whereas FIGS. 1 and 2 represented examples for the coupling of the checking circuit with the feedback shift register 10. Similarly, FIG. 3 represents an example for the gate circuit 24a connected between the seed provider 18 and input 16, whereas FIGS. 1 and 2 represent examples for an arrangement of the gate circuit 24b within feedback shift register 10. Although, however, in FIGS. 1 and 2 the gate circuit is shown to be serially connected into the feedback path, including the feedback function circuit 32, this is not the only possibility. The gate circuit 24b may also be connected between two consecutive memory cells of the feedback shift register. Moreover, it is noted that although FIGS. 1-3 show examples where both the checking circuit 26 as well as the gate circuit 24 are either coupled to or arranged in, respectively, input 16 or feedback shift register 10, the other two possibilities are also possible. For example, in the case of FIG. 3, the gate circuit 24 may be serially connected into the feedback path, whereas the checking circuit 26 is connected between the seed provider 18 and input 16.

Finally, it is noted that the examples given for the feedback shift registers are only of an illustrative nature. Feedback shift registers having more than one shift register line with a feedback function circuit interconnecting these shift register lines may also be used. Moreover, the feedback shift register 10 may be a linear or non-linear shift register, such as a shift register of length n with a period length of $2^n-1$.

The above circuits shown in FIGS. 1-4 may be used as a pseudo noise generator in a mobile communication system, or as a key stream generator for a stream cipher coupled to output 14, but not shown in the figures for ease of understanding.

In particular, it is noted that the alarm circuit may be configured to perform a fault-attack counter measure such as the just-mentioned shutting-down feedback shift register, or the circuit coupled to the output thereof, upon the detection of a fixed state by the checking circuit 26, only in case the exception occurs a number of feedback shift register clock cycles after a completion of a seed of the feedback shift register by the seed provider 18 with the number exceeding a predetermined clock cycle number. The predetermined clock cycle number may be selected such that it is ensured that the fixed state detected is not a consequence of an unlucky seeding of the feedback shift register by the seed provider 18, but very likely the result of a physical attack on the feedback shift register's mode of operation.

Further it is noted that the above embodiments may also be applied to feedback shift registers having more than two cycles with the cycles possibly having different lengths. Accordingly, there may be more than one non-allowed state which the control circuit or the checking circuit is responsive to.

Depending on an actual implementation, the above embodiments can be implemented in hardware or in software. Therefore, they also relate to a computer program, which can be stored on a computer-readable medium such as a CD, a disk or any other data carrier. These embodiments define, therefore, also a computer program having a program code which, when executed on a computer, performs the above methods described in connection with the above figures.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A feedback shift register control circuit, comprising:
a checking circuit having an input being coupled to a seed input of a feedback shift register or to an internal node of the feedback shift register, the checking circuit configured to be responsive to a signal at the input indicating that the feedback shift register is in a not-allowed state or is going to assume a not-allowed state, to output an exception signal; and
a gate circuit being coupled to the seed input or the feedback shift register and configured to be responsive to the exception signal to change the state of the feedback shift register or seed the feedback shift register such that the feedback shift register assumes an allowed state.

2. The feedback shift register control circuit according to claim 1, wherein the feedback shift register is a feedback shift register having a length n and a period length of $2^n-1$, and the checking circuit is further configured to be responsive to a signal at the input indicating that the feedback shift register is in a fixed state, or is going to assume a fixed state, to output the exception signal.

3. The feedback shift register control circuit according to claim 1, wherein the checking circuit is coupled to a feedback path of the feedback shift register and is further configured to be responsive to a feedback signal on the feedback path assuming one of a logical 1 or a logical 0 for a number of feedback shift register clock cycles equal to or greater than a predetermined number.

4. The feedback shift register control circuit according to claim 3, wherein the predetermined number is equal to a number of memory cells forming the feedback shift register.

5. The feedback shift register control circuit according to claim 1, wherein the gate circuit is further configured to change the state of the feedback shift register by altering a feedback signal of the feedback shift register.

6. The feedback shift register control circuit according to claim 1, wherein the gate circuit is a logical gate comprising a first input, a second input and an output, the logical gate being serially connected into a feedback path of the feedback shift register via the first input and the output of the logical gate, with the exception signal being applicable to the second input of the logical gate.

7. The feedback shift register control circuit according to claim 1, wherein the checking circuit has the input coupled to an internal node of the feedback shift register,
the feedback shift register control circuit further comprising a fault-attack counter measure unit configured to be responsive to the exception signal a number of feedback shift register clock cycles after a completion of a seeding of the feedback shift register with the number exceeding a predetermined clock cycle number, and to be non-responsive to the exception signal a number of feedback shift register clock cycles after the completion with the number not exceeding the predetermined clock cycle number.

8. The feedback shift register control circuit according to claim 1, wherein the checking circuit comprises a counter configured to be clocked upon the signal at the input assuming one of a first and a second logical state, and to be reset upon the signal at the input assuming the other one of the first and the second logical state, and a counter state surveillance unit being configured to survey a counter value of the counter with regard to the counter value reaching a predetermined counter value, and to output an exception signal if the counter value reaches the predetermined counter value.

9. An apparatus controlling a feedback shift register, comprising:
means for checking one of whether the feedback shift register is in a not-allowed state or whether the feedback shift register is seeded such that the feedback shift register is going to assume the not-allowed state; and
means for, upon the one of the feedback shift register being in the not-allowed state, or the feedback shift register being seeded such that the feedback shift register is going to assume the not-allowed state, changing the state of the feedback shift register or seeding the feedback shift register such that the feedback shift register assumes an allowed state.

10. The apparatus according to claim 9, wherein the feedback shift register is a feedback shift register having a length n and a period length of $2^n-1$, and the means for checking is configured to check one of whether the feedback shift register is in a fixed state, or is seeded such that the feedback shift register is going to assume the fixed state.

11. The apparatus according to claim 9, wherein the means for checking is configured to survey a feedback signal of the feedback shift register and to regard the feedback shift register as being in the not-allowed state if the feedback signal assumes one of a logical 1 and a logical 0 for a number of feedback shift register clock cycles equal to or greater than a predetermined number.

12. The apparatus according to claim 9, wherein the means for changing is configured to change the feedback shift register's state by altering the feedback signal of the feedback shift register.

13. The apparatus according to claim 9, wherein the means for checking is configured to check as to whether the feedback shift register is in the not-allowed state, the apparatus further comprising:
means for performing a fault-attack counter measure upon the feedback shift register being in the not-allowed state if a number of feedback shift register clock cycles has passed since a completion of the seeding of the feedback shift register exceeding a predetermined clock cycle number, and not performing the fault-attack counter measure if the number of feedback shift register clock cycles since the completion does not exceed the predetermined clock cycle number.

14. A method for controlling a feedback shift register, comprising:
checking one of whether the feedback shift register is in a not-allowed state or whether the feedback shift register is seeded such that the feedback shift register is going to assume the not-allowed state; and
upon the one of the feedback shift register being in the not-allowed state, or the feedback shift register being seeded such that the feedback shift register is going to assume the not-allowed state, changing the state of the feedback shift register or seeding the feedback shift register such that the feedback shift register assumes an allowed state.

15. The method according to claim 14, wherein the feedback shift register is a feedback shift register having a length n and a period length of $2^n-1$, and the checking is performed so as to check one of whether the feedback shift register is in a fixed state, or is seeded such that the feedback shift register is going to assume the fixed state.

16. The method according to claim 14, wherein the checking is performed so as to survey a feedback signal of the feedback shift register and to regard the feedback shift register as being in the not-allowed state if the feedback signal assumes one of a logical 1 and a logical 0 for a number of feedback shift register clock cycles equal to or greater than a predetermined number.

17. The method according to claim 14, wherein the predetermined number is equal to a number of memory cells forming the feedback shift register.

18. The method according to claim 14, wherein the changing is performed so as to change the feedback shift register's state by altering the feedback signal of the feedback shift register.

19. The method according to claim 14, wherein the checking is performed so as to check as to whether the feedback shift register is in the not-allowed state, the method further comprising:
performing a fault-attack counter measure upon the feedback shift register being in the not-allowed state if a number of feedback shift register clock cycles has passed since a completion of the seeding of the feedback shift register exceeding a predetermined clock cycle number, and not performing the fault-attack counter measure if the number of feedback shift register clock cycles since the completion does not exceed the predetermined clock cycle number.

20. A circuit comprising:
a feedback shift register coupled to an output of a true random number generator and having a feedback function defining a fixed state among possible internal states of the feedback shift register; and
a control circuit being responsive to the fixed state to influence the internal state of the feedback shift register.

21. The circuit according to claim 20, wherein the feedback shift register is a feedback shift register having a length n and a period length of $2^n-1$, with the fixed state being an all ones or all zeros state.

22. The circuit according to claim 20, wherein the control circuit is coupled to a feedback path of the feedback shift register and is responsive to a feedback signal on the feedback path assuming one of a logical 1 or a logical 0 for a number of feedback shift register clock cycles equal to or greater than a predetermined number, to influence the internal state of the feedback shift register.

23. The circuit according to claim 20, wherein the control circuit is configured to influence the internal state of the feedback shift register by altering a feedback signal of the feedback shift register.

24. The circuit according to claim 20, further comprising a fault-attack counter measure unit also being responsive to the fixed state a number of feedback shift register clock cycles after a completion of a seeding of the feedback shift register with the number exceeding a predetermined clock cycle number, and being non-responsive to the exception signal a number of feedback shift register clock cycles after the completion with the number not exceeding the predetermined clock cycle number.

25. A computer readable medium having a computer program instruction recorded thereon for performing, when running on a computer, a method for controlling a feedback shift register, comprising:

checking one of whether the feedback shift register is in a not-allowed state or whether the feedback shift register is seeded such that the feedback shift register is going to assume the not-allowed state; and upon the one of the feedback shift register being in the not-allowed state, or the feedback shift register being seeded such that the feedback shift register is going to assume the not-allowed state, changing the state of the feedback shift register or seeding the feedback shift register such that the feedback shift register assumes an allowed state.

* * * * *